(12) United States Patent
Weimer et al.

(10) Patent No.: US 10,454,683 B2
(45) Date of Patent: Oct. 22, 2019

(54) BLOCKCHAIN SYSTEMS AND METHODS FOR USER AUTHENTICATION

(71) Applicant: Capital One Services, LLC, McLean, VA (US)

(72) Inventors: Jonathan Weimer, Henrico, VA (US); Ryan Fox, Alexandria, VA (US)

(73) Assignee: CAPITAL ONE SERVICES, LLC, Mclean, VA (US)

( * ) Notice: Subject to any disclaimer, the term of this patent is extended or adjusted under 35 U.S.C. 154(b) by 44 days.

(21) Appl. No.: 15/626,054

(22) Filed: Jun. 16, 2017

(65) Prior Publication Data

US 2017/0366348 A1    Dec. 21, 2017

Related U.S. Application Data

(60) Provisional application No. 62/351,894, filed on Jun. 17, 2016.

(51) Int. Cl.
*H04L 9/32*  (2006.01)
*H04L 9/06*  (2006.01)
*H04L 9/08*  (2006.01)

(52) U.S. Cl.
CPC .......... *H04L 9/3213* (2013.01); *H04L 9/0618* (2013.01); *H04L 9/0838* (2013.01);
(Continued)

(58) Field of Classification Search
CPC .......... G06F 21/30; G06F 21/44; G06F 21/70; G06F 21/45; G06F 21/62; G06F 21/6209;
(Continued)

(56) References Cited

U.S. PATENT DOCUMENTS

2009/0158414 A1*  6/2009  Chaudhry .......... H04L 63/0823
                                                          726/10
2012/0084556 A1*  4/2012  Brown .................. H04L 9/3265
                                                          713/156
(Continued)

FOREIGN PATENT DOCUMENTS

WO    WO 2013/049461 A2    4/2013

*Primary Examiner* — Saleh Najjar
*Assistant Examiner* — Khalid M Almaghayreh
(74) *Attorney, Agent, or Firm* — Finnegan, Henderson, Farabow, Garrett & Dunner, LLP

(57) ABSTRACT

Computer-implemented systems and methods for user authentication based on blockchain technology. The authentication may comprise operations including receiving, from a user system, an authentication request for a user. The operations may also include determining a root system for the user using a blockchain, and redirecting a member system to the root system. The operations may include receiving, following redirection, a verification message indicating that the root system successfully authenticated the user, and including an authorization code for receiving, from the root system, a root system secret. The operations may include receiving from a database, identification data using the root system secret. Determining the root system may comprise identifying, using the authentication request and index information stored in the blockchain, a block of the blockchain storing root system information for the user. Receiving the identification data may comprise retrieving identification data from the database.

22 Claims, 10 Drawing Sheets

(52) U.S. Cl.
CPC .......... *H04L 9/3242* (2013.01); *H04L 9/3247* (2013.01); *H04L 2209/38* (2013.01)

(58) Field of Classification Search
CPC ..... G06F 2221/2141; G06F 2221/2113; H04L 63/10; H04L 63/101; H04L 63/08; H04L 63/0227; H04L 63/105; H04L 63/0807; H04L 63/0823; H04L 63/0853; H04L 9/088; H04L 9/3213; H04L 9/32; H04L 9/321; H04L 9/3218; H04L 9/3268; H04L 9/3265; H04L 29/06
USPC .............. 726/2, 4–7, 9, 13, 17–21; 713/150, 713/154–157, 167, 170, 171
See application file for complete search history.

(56) References Cited

U.S. PATENT DOCUMENTS

| | | |
|---|---|---|
| 2013/0086657 A1† | 4/2013 | Srinivasan et al. |
| 2013/0117560 A1 | 5/2013 | Resch et al. |
| 2013/0226799 A1† | 8/2013 | Raj |
| 2016/0028737 A1* | 1/2016 | Srinivasan .......... H04L 63/0807 726/1 |
| 2016/0098723 A1* | 4/2016 | Feeney .............. G06Q 20/4016 705/75 |
| 2016/0342977 A1* | 11/2016 | Lam ........................ G06Q 20/02 |
| 2017/0103167 A1* | 4/2017 | Shah ................... G06F 11/1464 |
| 2017/0140408 A1* | 5/2017 | Wuehler ............ G06Q 30/0207 |
| 2017/0149560 A1* | 5/2017 | Shah ...................... H04L 9/0637 |
| 2017/0213221 A1* | 7/2017 | Kurian ............... G06Q 20/4014 |
| 2017/0243222 A1* | 8/2017 | Balasubramanian ........................ G06Q 20/4016 |
| 2017/0244707 A1* | 8/2017 | Johnsrud ................ H04L 63/08 |
| 2017/0329980 A1† | 11/2017 | Hu et al. |
| 2017/0344580 A1* | 11/2017 | King ................. G06F 17/30097 |
| 2017/0344987 A1* | 11/2017 | Davis ................. G06F 17/3033 |

\* cited by examiner
† cited by third party

BLOCKCHAIN SYSTEMS AND METHODS FOR USER AUTHENTICATION

TECHNICAL FIELD

The disclosed embodiments concern an authentication system including multiple member systems. More specifically, the disclosed embodiments concern recording authentication information for a user in a blockchain, and enabling members of the authentication system to retrieve user identification data from a database using the authentication information.

BACKGROUND

Users may attempt interactions with computer systems associated with multiple institutions. These institutions may configure their associated computer systems to require authentication of users attempting to access the computer systems. Implementing such authentication requirements can impose time and resource burdens on the institutions. Additionally, users may resent having to respond to repeated authentication requests as they navigate between computer systems associated with different institutions. Institutions and users may therefore benefit from a collaborative authentication system that handles authentication interactions for multiple institutions.

But such collaboration requires overcoming certain technical problems. A preferable authentication system would track authentication interactions for users attempting to access the computer systems of the participating institutions. Such an authentication system would be non-reputable, preventing users or institutions from later challenging authentication records as false or inaccurate. Furthermore, a preferable authentication system would limit sharing of personal information between the users and the institutions. The authentication system would also be constructed in a way that encouraged the participating institutions to trust in the validity of the authentication records. A need therefore exists for an authentication system architecture that addresses these technical problems. The disclosed embodiments provide a specific example of such an authentication system architecture.

SUMMARY

The disclosed embodiments concern an authentication system that maintains a distributed, non-reputable record of authentication interactions, while limiting the sharing of personal information between institutions. This authentication system may be used by multiple participating member systems. Accordingly, as described in greater detail below, this system solves the above-mentioned technical problems with collaborative authentication systems.

In some embodiments, a root system may establish an identity for each user of the authentication system. The root system may store information in a blockchain. This information may enable other members of the authentication system to locate the root system. The root system may also store identification data for the user in a database. Member systems may rely on the root system for authenticate the user, and may interact with the root system to retrieve the stored identification data. The blockchain may provide a distributed, non-reputable record of interactions between the user, the member systems, and the root system.

The disclosed embodiments may include, for example, an authentication system comprising at least one processor; and at least one non-transitory memory. The non-transitory memory may contain instructions that, when executed by the at least one processor, cause the authentication system to perform operations. The operations may comprise receiving, from a user system, an authentication request for a user. The operations may also comprise determining a root system for the user using a blockchain, and redirecting the user system to the root system. The operations may also comprise receiving, from the root system, a root system secret, and receiving, from a database, identification data using the root system secret.

The disclosed embodiments may further include an authentication system comprising at least one processor; and at least one non-transitory memory. The non-transitory memory may contain instructions that, when executed by the at least one processor, cause the authentication system to perform operations. The operations may comprise receiving personal information for a user. The operations may also comprise generating identification data and index information for the user using the received personal information. The operations may additionally comprise writing the root system information and the index information to a blockchain, encrypting the identification data using a root system key; and storing the encrypted identification data in a database.

It is to be understood that both the foregoing general description and the following detailed description are exemplary and explanatory only and are not restrictive of the disclosed embodiments, as claimed.

BRIEF DESCRIPTION OF THE DRAWINGS

The drawings are not necessarily to scale or exhaustive. Instead, emphasis is generally placed upon illustrating the principles of the inventions described herein. The accompanying drawings, which are incorporated in and constitute a part of this specification, illustrate several embodiments consistent with the disclosure and together with the description, serve to explain the principles of the disclosure. In the drawings.

DETAILED DESCRIPTION

Reference will now be made in detail to the disclosed embodiments, examples of which are illustrated in the accompanying drawings. Wherever convenient, the same reference numbers will be used throughout the drawings to refer to the same or like parts.

Figure 1:
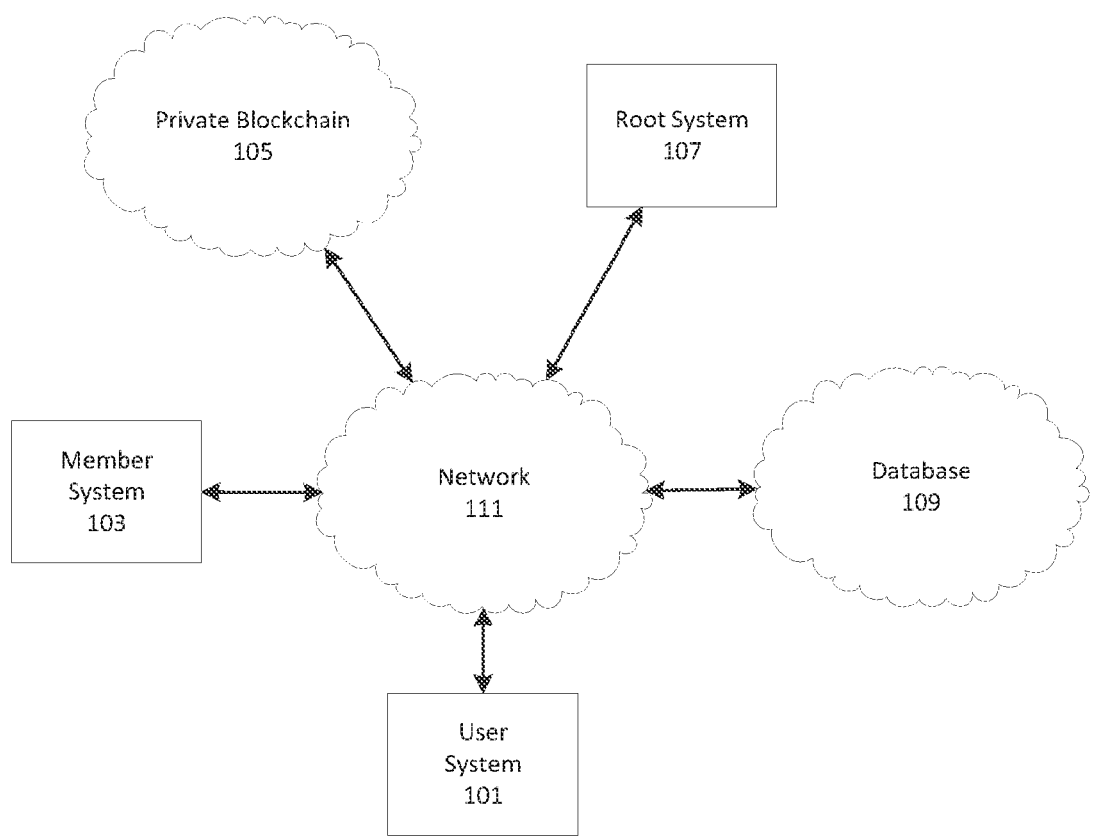
FIG. 1 depicts a schematic of an exemplary system for authenticating users.

FIG. 1 depicts a schematic of an exemplary system for authenticating users (authentication system 100), consistent with disclosed embodiments. Authentication system 100 may comprise systems with access to blockchain 105 and database 109 over network 111. Authentication system 100 may enable the systems to share user authentication information and responsibility for authenticating users. For each user, as described below, a system may initially authenticate a user. This system becomes the root system for this user (e.g., root system 107). This system may create a message in blockchain 105 corresponding to the user. This entry may indicate the user, and provide root system information for contacting root system 107. Root system 107 may also be configured to create an entry in database 109 storing identification data for user. The remaining systems, referred to herein a member system (e.g., member system 103), may be configured to redirect authentication requests from a user system (e.g., user system 101) for the user to the root system 107. The member system may be configured to recover the identification data for the user from database 109, following authentication of the user by root system 107. The member system may be configured to document this authentication transaction in blockchain 105.

The disclosed authentication system can therefore use the root system to securely store personal information. The disclosed authentication system can also generate a non-reputable record of authentication interactions using a blockchain, which can also provide information enabling the participating systems to contact the root system. Furthermore, this blockchain can be distributed, encouraging trust in the validity of the authentication interaction records. In this manner, the disclosed authentication systems provide an innovative technical solution to at least the above-mentioned technical problems with collaborative authentication systems.

As would be recognized by one of skill in the art, the description of authentication system 100 in FIG. 1 is not intended to be limiting. In some embodiments, additional elements may be added, and/or the depicted elements of authentication system 100 may be combined, divided, modified, or removed. For example, envisioned embodiments may implement a superset or a subset of the depicted elements of authentication system 100. As an additional example, in some embodiments, at least one of blockchain 105 and database 109 may be implements by another element of authentication system 100 (e.g., member system 103 or root system 107).

User system 101 may be configured to provide an authentication request, consistent with disclosed embodiments. User system 101 may comprise a computing device, such as a server, workstation, desktop, or mobile device (e.g., laptop, tablet, phablet, smartphone, smartwatch, or similar mobile computing device). As described below with respect to FIG. 7, user system 101 may be configured with a display and input/output interfaces. User system 101 may be configured to interact with a user (not shown) using the display and input/output interfaces. User system 101 may be configured to contact member system 103 and provide an authentication request for the user, based on this interaction. User system 101 may be configured as an "end-user" in an OpenID framework, as described in "OpenID Authentication 2.0—Final," referred to herein as "OpenID" and hereby incorporated by reference in its entirety.

Member system 103 may be configured to authenticate users, consistent with disclosed embodiments. Member system 103 may include one or more computing devices, such as servers, workstations, desktop computers, or special-purpose computing devices. Member systems (e.g., member system 103) may act as "relying parties" in an OpenID framework, as described in OpenID and incorporated herein by reference. Member system 103 may be standalone, or it may be part of a subsystem, which may be part of a larger system. For example, member system 103 may be associated with a commercial institution. Member system 103 may include distributed servers that are remotely located and communicate with other systems of the financial institution over a public network, or over a dedicated private network.

Member system 103 may be configured to receive a request to authenticate a user. In some embodiments, member system 103 may be configured to receive the request from another element of authentication system 100, such as user system 101, or from another system. Member system 103 may be configured to interact with blockchain 105, root system 107, and database 109 to process the authentication request. In some embodiments, processing the authentication request may comprise receiving identification data from database 109. Member system 103 may be configured to use this identification data to perform a business process. For example, the business process may require customer identification, according to statutory or regulatory guidelines. The receipt of the identification data may satisfy these guidelines. As an additional example, the received identification data may be used to populate forms, expediting the business process and improving the customer experience.

Member system 103 may be configured to store messages in blockchain 105, consistent with disclosed embodiments. In some aspects, member system 103 may be configured to add blocks containing the messages to blockchain 105. In various aspects, member system 103 may be configured to provide the messages to an authorized system. The authorized system may be configured to add blocks containing the messages to blockchain 105. As described below with regards to FIG. 3A, the messages may comprise index information 303 and authentication records 307.

Blockchain 105 may comprise a distributed data structure, consistent with disclosed embodiments. Blockchain 105 may be a private blockchain. For example, authorized systems may store copies of blockchain 105. These authorized systems may be configured to add blocks to blockchain 105 and publish the blocks to other authorized systems. Authorized systems may be configured to receive messages from other systems for publication in blockchain 105. These other systems may have read-only access to blockchain 105. In some embodiments, at least one of member system 103 and root system 107 are authorized systems. In various embodiments, member system 103 and root system 107 may not be authorized systems. As described in detail with respect to FIG. 3A, blockchain 105 may be configured to store messages from member systems including authentication records 307, and messages from root systems including root system information 305.

Root system 107 may be configured to authenticate users, consistent with disclosed embodiments. Root system 107 may include one or more computing devices, such as servers, workstations, desktop computers, or special-purpose computing devices. In some embodiments, root system 107 may be associated with an OpenID connect endpoint. As would be understood by one of skill in the art, the OpenID connect endpoint may enable the root system 107 to serve as an identify provider. Root system 107 may be standalone, or it may be part of a subsystem, which may be part of a larger system. For example, root system 107 may be associated with a commercial institution. Root system 107 may include distributed servers that are remotely located and communicate with other systems of the financial institution over a public network, or over a dedicated private network. Root system 107 may be configured to receive a request to authenticate a user. In some embodiments, root system 107 may be configured to receive the request from another element of authentication system 100, such as user system 101, or from another system.

Database 109 may be configured to store identification data for the user, consistent with disclosed embodiments. In some aspects, database 109 may comprise a distributed database. For example, database 109 may comprise a federated database. As an additional example, database 109 may comprise a distributed hash table. In some aspects, nodes of this distributed hash table may be associated with members of authentication system 100 (e.g., member system 103 and root system 107).

Network 111 may be configured to provide communications between components of FIG. 1. For example, network 111 may be any type of network (including infrastructure) that provides communications, exchanges information, and/or facilitates the exchange of information, such as the Internet, a Local Area Network, or other suitable connection(s) that enables authentication system 100 to send and receive information between the components of authentication system 100.

Figure 2:
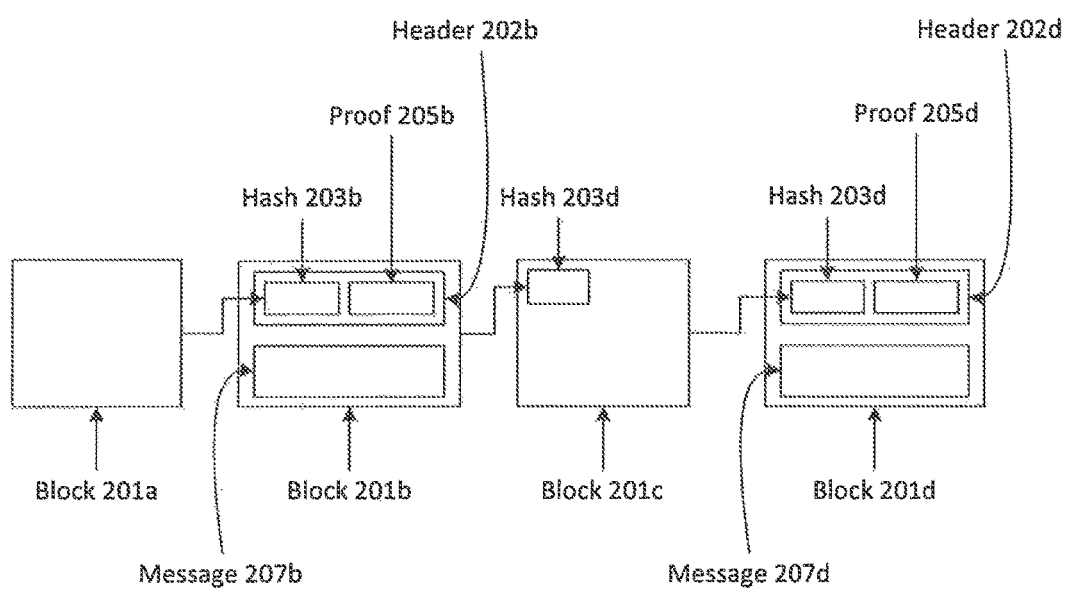
FIG. 2 depicts a logical model of an exemplary blockchain.

FIG. 2 depicts a logical model of an exemplary blockchain, consistent with disclosed embodiments. Blockchain 105 may comprise many such blockchains maintained by many different systems (e.g., member system 103, root system 107, or other systems). Such exemplary blockchains may comprise blocks, such as blocks 201a-201d. Blocks may include messages, such as message 207b and message 207d. Blocks may include a header, such as header 202b. The header may include at least one of the previous block's hash (e.g., hash 203b), a hash of any messages in the block (e.g., a Merkle root) and a timestamp. Consistent with disclosed embodiments, authentication system 100 may require that blocks added to blockchain 105 satisfy at least one of a proof-of-work condition and a digital signature condition. For example, the header may include a nonce chosen to ensure the header satisfies the proof-of-work condition. As a non-limiting example, the proof-of-work condition may require the hash of the header fall within a predetermined range of values. As an additional example, the header may be digitally signed with a cryptographic key of an authorized system, and the digital signature may be included in the header. This digital signature may be verified using a key available to the members of authentication system 100.

Figure 3A:
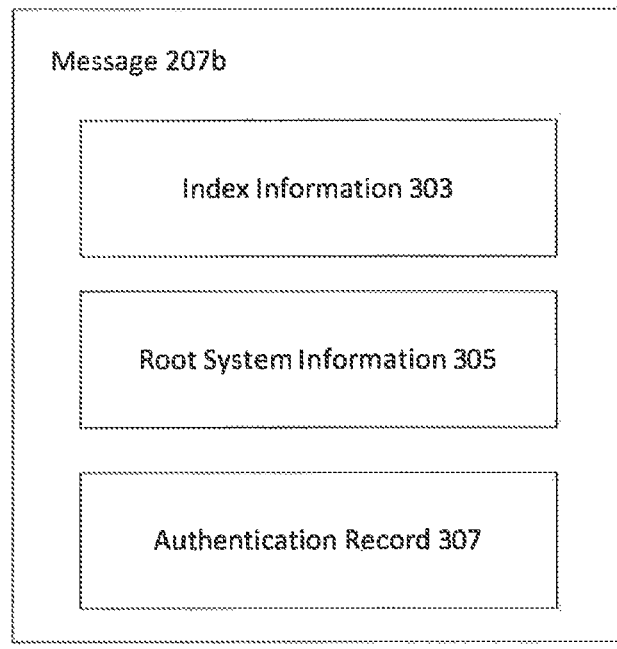
FIG. 3A depicts a logical model of a message stored in a blockchain.

FIG. 3A depicts a logical model of a message 207b stored in a blockchain (e.g., an element of blockchain 105), consistent with disclosed embodiments. In some embodiments, message 207b may comprise index information 303. In certain aspects, index information 303 may comprise information identifying a user. For example, index information 303 may be at least one of a full name, email address, phone number, or other non-sensitive personal information of the user. In various aspects, index information 303 may include one or more references to earlier blocks in the private blockchain. For example, index information 303 may include one or more references to one or more earlier blocks associated with the same user. A reference may include, as a non-limiting example, a hash of a preceding block in the blockchain associated with the same user. In some aspects, index information 303 may be obfuscated or encrypted according to methods known to one of skill in the art. For example, index information 303 may be encrypted with a cryptographic key. As an additional example, index information 303 may comprise a hash of the at least one of a full name, email address, phone number, or other non-sensitive personal information of the user.

Message 207b may comprise root system information 305, consistent with disclosed embodiments. In some aspects, root system information 305 may indicate a location associated with root system 107. For example, root system information 305 may comprise a Uniform Resource Identifier (URI), such as a Uniform Resource Locator (URL) for root system 107. As an additional example, root system information 305 may comprise an Extensible Resource Identifier (XRI) for root system 107, as described in OpenID and incorporated herein by reference. As an additional example, root system information 305 may comprise a name or token, such as a uniform resource name (URN). In some aspects, a member of authentication system 100 may be configured to use root system information 305 to retrieve a URI or XRI for root system 107. For example, the URI and/or XRI may indicate the location of a service that, in turn, provides the location of root system 107. As an additional example, a translation service hosted by an element of authentication system 100, or another system, may translate the name or token into a location of root system 107. In various aspects, root system information 305 may be obfuscated or encrypted according to methods known to one of skill in the art. For example, root system information 305 may be encrypted with a cryptographic key.

Message 207b may comprise authentication record 307, consistent with disclosed embodiments. In some aspects, authentication record 307 may comprise information enabling subsequent auditing of transactions. For example, authentication record 307 may identify at least one of member system 103, a commercial institution associated with member system 103, root system 107, a commercial institution associated with root system 107, a purpose of the authentication request, a result of the authentication request, and information related to the authentication request. In some aspects, a purpose of the authentication request may include the creation of a relationship (e.g., a financial relationship, such as a bank account, brokerage account, credit card account, and/or loan account) with a commercial institution associated with member system 103, or the performance of a service by member system 103 (e.g., a financial server, such as performing transactions in a financial account associated with the user, cashing a check provided by the user, and/or selling a cashier's check to the user). As would be appreciated by one of skill in the art, the above exemplary authentication purposes are not intended to be limiting. In some aspects, a result of the authentication request may include whether the purpose of the authentication request was achieved. For example, when the purpose of the authentication request was creation of a relationship, the result of the authentication request may indicate whether the relationship was created. As another example, when the purpose of the authentication request was performance of a service, the result of the authentication request may indicate whether the service was performed. As would be appreciated by one of skill in the art, the above exemplary authentication results are not intended to be limiting. In some aspects, information related to the authentication request may include additional contact information, demographic information, financial information, or similar personal information provided in connection with the authentication request. In some aspects, such information may merely indicate that such information was provided, and/or provide a location where such information may be obtained. In some aspects, authentication record 307 may be obfuscated or encrypted according to methods known to one of skill in the art. For example, authentication record 307 may be encrypted with a cryptographic key.

Cryptographic keys may be used to encrypt elements of messages in blocks, consistent with disclosed embodiments. In some aspects, such cryptographic keys may be associated with members of authentication system 100 (e.g., member system 103 or root system 107). In various aspects, at least some of the cryptographic keys may be associated with authorized systems. Corresponding cryptographic keys may be available to decrypt the encrypted message elements, consistent with disclosed embodiments. For example, when an element of a message in a block is encrypted with a symmetric key, the same symmetric key may be available for decrypting the encrypted element. As another example, when an element of a message in a block is encrypted with a private key, a corresponding public key may be available for decrypting the encrypted element. In some aspects, the corresponding cryptographic keys may be available to members of authentication system (e.g., member system 103 and root system 107).

Figure 3B:
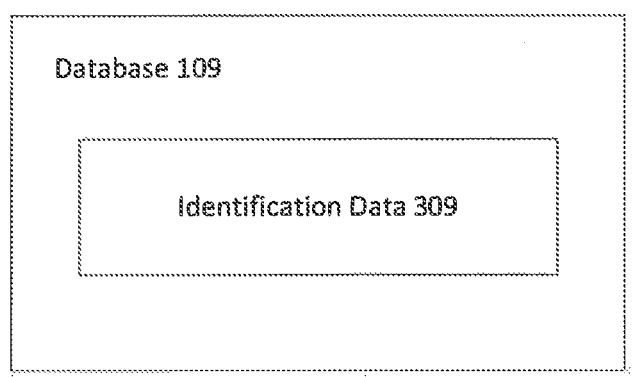
FIG. 3B depicts a logical model of identification data stored in a database.

FIG. 3B depicts a logical model of identification data 309 stored in database 109, consistent with disclosed embodiments. In some aspects, identification data 309 may comprise sensitive personal information, such as a social security number, taxpayer identification number, financial information, health information, employment information, demographic information, or other personal information disclosure of which might harm or embarrass the user. In various aspects, identification data 309 may comprise information gathered in compliance with statutory or regulatory guidelines for identifying customers, such as "Know Your Customer" guidelines under the USA Patriot Act. In some aspects, identification data 309 may comprise an indication of a method used to authenticate a user to the commercial institution associated with root system 107. For example, identification data 309 may indicate that a driver's license with a particular driver's license number was presented to representatives of the commercial institution. As an additional example, identification data 309 may comprise an image of the driver's license.

In some embodiments, identification data 309 may be encrypted according to methods known to one of skill in the art. For example, identification data 309 may be encrypted using the Advanced Encryption Standard (AES) or similar encryption methods. As would be appreciated by one of skill in the art, a cryptographic key may be used to decrypt identification data 309. For example, root system 107 may be configured to generate a root system key for encrypting entries stored in database 109 by root system 107. Root system 107 may be configured to provide the root system key to other members of authentication system 100. In some embodiments, identification data 309 may be combined with a cryptographic salt prior to encryption. In some embodiments, the cryptographic salt may be a value specific to root system 107. Converting identification data 309 to plaintext may require knowledge of the cryptographic salt, as would be understood by one of skill in the art. In some aspects, root system 107 may be configured to provide the cryptographic salt to other members of authentication system 100. In some embodiments, identification data 309 may be combined with a cryptographic pepper prior to encryption. In some embodiments, the cryptographic pepper may be common to all entries in database 109. Converting identification data 309 to plaintext may require knowledge of the cryptographic pepper, as would be understood by one of skill in the art.

Figure 4:
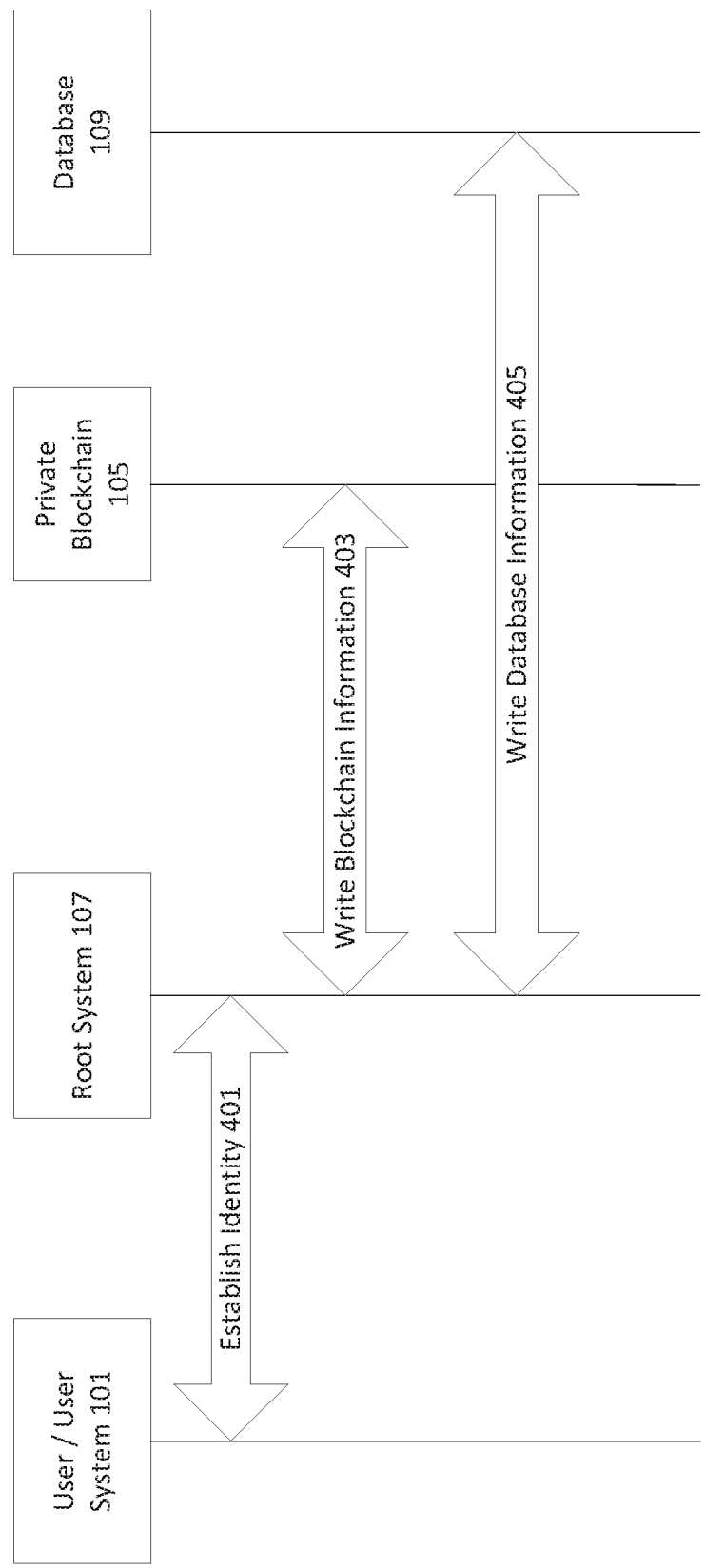
FIG. 4 depicts an exemplary process for establishing a user identity.

FIG. 4 depicts an exemplary process for establishing a user identity in the context of authentication system 100, consistent with disclosed embodiments. In some embodiments, root system 107 may be configured to establish a user identity in step 401. For example, root system 107 may be configured to receive personal information for the user. As depicted in FIG. 4, root system 107 may be configured to receive at least some of the personal information from the user. Root system 107 may be configured to receive this information directly from the user. For example, the user may interact with an input/output interface of root system 107. Root system 107 may be configured to receive this information indirectly from the user. For example, root system 107 may be configured to receive the personal information from an agent or constituent of the user, or from an operator of the authentication system (e.g., an employee of a commercial institution associated with root system 107). Root system 107 may be configured to receive this information from a system associate with the user, such as user system 101. The content of the personal information may depend on statutory or regulatory guidelines for identifying customers, such as "Know Your Customer" guidelines under the USA Patriot Act. The receipt of the personal information may satisfy these guidelines. In some aspects, root system 107 may be configured to augment the personal information with information retrieved from other sources, such as information retrieved from public records, credit reporting agencies, or other sources.

In some embodiments, prior to establishing a user identity, member system 103 may be configured to determine that authentication system 100 lacks an identity for the user. For example, member system 103 may be configured to determine that blockchain 105 does not include a block corresponding to the user. This determination may use the personal information provided by the user, the index information stored in blockchain 105. For example, member system 103 may be configured to use probabilistic matching methods known to one of skill in the art, as describe below with respect to step 503, to determine that blockchain 105 does not include a block corresponding to the user.

Root system 107 may be configured to store a message to blockchain 105 in step 403, consistent with disclosed embodiments. In some aspects, the message may comprise index information 303 and root system information 305. Root system 107 may be configured to generate index information 303 using the personal information. For example, root system 107 may be configured to generate a hash of a portion of the personal information. As an additional example, root system 107 may be configured to encrypt a portion of the personal information. As noted above, this personal information may be received directly or indirectly from the user, and may be augmented with information received from other sources. Root system 107 may be configured to generate root system information 305 using configuration information for root system 107. In some aspects, this configuration information may be predetermined. In various aspects, this information may be dynamically discovered by root system 107, according to methods known to one of skill in the art. In some aspects, root system 107 may be configured to add blocks containing the messages to blockchain 105. In various aspects, root system 107 may be configured to provide the messages to an authorized system. The authorized system may be configured to add blocks containing the messages to blockchain 105.

Root system 107 may be configured to store identification data 309 to database 109 in step 405, consistent with disclosed embodiments. Root system 107 may be configured to generate identification data 309 using the personal information. As noted above, this personal information may be received directly or indirectly from the user, and may be augmented with information received from other sources. As described above, identification data 309 may be encrypted using the Advanced Encryption Standard (AES) or similar encryption methods. In some aspects, root system 107 may be configured to encrypt identification data 309 prior to storage in database 109. In various aspects, database 109 may be configured to encrypt identification data 309 upon receipt of identification data 309 from root system 107.

Figure 5:
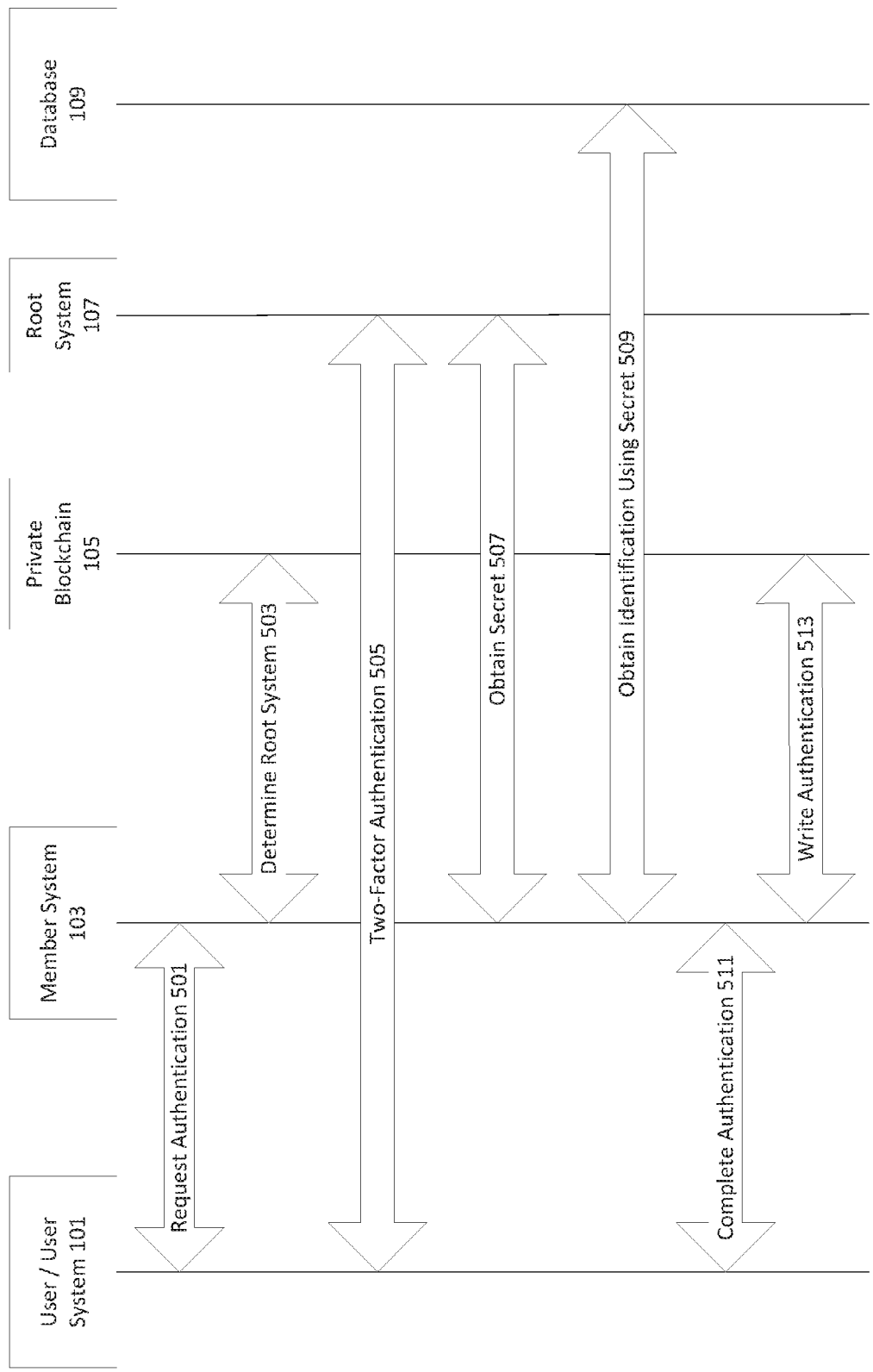
FIG. 5 depicts an exemplary process for authenticating a user.

FIG. 5 depicts an exemplary process for authenticating a user, consistent with disclosed embodiments. In some aspects, member system 103 may be configured to receive an authentication request in step 501. Member system 103 may be configured to receive the authentication request directly from the user. For example, the user may interact with an input/output interface of member system 103. Member system 103 may be configured to receive this information indirectly from the user. For example, member system 103 may be configured to receive the personal information from an agent or constituent of the user, or from an operator of the authentication system (e.g., an employee of the commercial institution associated with member system 103).

Member system 103 may be configured to determine root system 107 using blockchain 105 in step 503, consistent with disclosed embodiments. In some aspects, member system 103 may be configured to read blockchain 105 to determine whether at least one entry exists for the user. As a non-limiting example, member system 103 may be configured to receive personal information, such as a first name, last name, and date of birth from the user. Member system 103 may be configured to compare this information to index information 303 retrieved from blocks in blockchain 105. For example, member system 103 may be configured to determine index information 303 most likely corresponding to the user. In some aspects, member system 103 may be configured to determine index information 303 most likely corresponding to the user according to methods known to one of skill in the art. In some aspects, member system 103 may be configured to convert index information 303 to plaintext as part of this comparison. In various aspects, member system 103 may be configured to compares a hash stored in index information 303 to a hash generated using the received personal information.

Root system 107 may be configured to authenticate the user in step 505, consistent with disclosed embodiments. In some embodiments, member system 103 may be configured to direct the user to root system 107 for authentication. For example, member system 103 may be configured to provide a redirection message to user system 101, or another system associated with the user, according to methods known to one of skill in the art. In some aspects, this redirection message may include an identifier for an Open ID endpoint associated with root system 107, as described in OpenID and incorporated herein by reference. Root system 107 may be configured to receive credentials from the user system 101, or another system associated with the user. For example, root system 107 may be configured to receive a username and password. Root system 107 may be configured to authenticate the credentials according to methods known to one of skill in the art. In some embodiments, root system 107 may be configured to perform multi-factor authentication of the user. In some aspects, root system 107 may be configured to provide a consent message including a confirmation code to another device associated with the user. Root system 107 may be configured to provide the consent message after successfully authenticating the credentials. As non-limiting examples, root system 107 may be configured to send a text message including the confirmation code to a predetermined number of the user, or an email including the confirmation code to a predetermined email address of the user. Root system 107 may be configured to receive from user system 101, in response to the confirmation message, the confirmation code.

Member system 103 may be configured to receive a root system secret in step 507, consistent with disclosed embodiments. In some aspects, root system 107 may be configured to provide a verification message to member system 103. For example, root system 107 may be configured to provide the verification message upon successful completion of multi-factor authentication in step 505. In some aspects, the verification message may indicate successful completion of the multi-factor authentication. The verification message may include an authorization code. The authorization code may enable member system 103 to retrieve the root system secret from root system 107.

In some aspects, root system 107 may be configured to provide an authorization token to member system 103. The authorization token may comprise a OAuth authorization security token, as described in "The OAuth 2.0 Authorization Framework," by the Internet Engineering Task Force, incorporated herein by reference in its entirety. Root system 107 may be configured to delegate authorization to member system 103 to access database 109 by providing the authorization token to member system 103. In further aspects, root system 107 may be configured to provide at least one of the root system key and cryptographic salt, described above with regards to FIG. 3B, to member system 103. In some embodiments, root system 107 may be configured to provide at least one of the authorization token, the root system key, and the cryptographic salt in response to receiving the authorization code from member system 103.

Member system 103 may be configured to receive identification data 309 in step 509, consistent with disclosed embodiments. In some embodiments, database 109 may be configured to provide identification data 309 in response to receiving the authorization token from member system 103. In some aspects, database 109 may be configured to provide encrypted identification data 309 to member system 103. Member system 103 may be configured to use at least one of the root system key and the cryptographic salt to decrypt identification data 309. In some aspects, member system 103 may be configured to provide at least one of the root system key and the cryptographic salt to database 109. In response, database 109 may be configured to decrypt identification data 309, and to provide the decrypted identification data 309 to member system 103.

Member system 103 may be configured to receive complete authentication of the user in step 511, consistent with disclosed embodiments. In some embodiments, member system 103 may be configured to use the decrypted identification data 309 to complete authentication of the user. For example, when the user requests authentication in the context of a business process subject to statutory or regulatory requirements, such as "Know Your Customer" requirements, the decrypted identification data 309 may be sufficient to satisfy these requirements. In some embodiments, the decrypted identification data 309 may be provided to the user. For example, member system 103 may be configured to provide the decrypted identification data 309 to user system 101. In some embodiments, member system 103 may be configured to pre-populate a form with the decrypted identification data 309, and provide this prepopulated form to the user. User system 101, or another system, may be configured to receive additional information from the user, and update the prepopulated form with this information. User system 101, or another system, may be configured to provide this update form to member system 103.

Member system 103 may be configured to store authentication information for the authentication request in step 513, consistent with disclosed embodiments. The authentication information may comprise index information 303. The authentication information may comprise authentication record 307. As described above with regards to FIG. 3A, authentication record 307 may comprise information enabling subsequent auditing of transactions.

Figure 6:
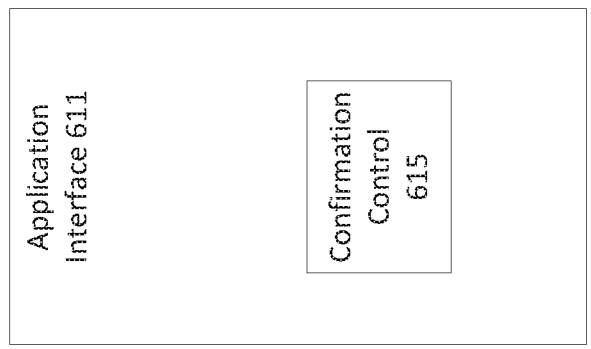
FIG. 6 depicts exemplary user interfaces for multi-factor authentication.
Figure 6:
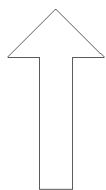
Figure 6:
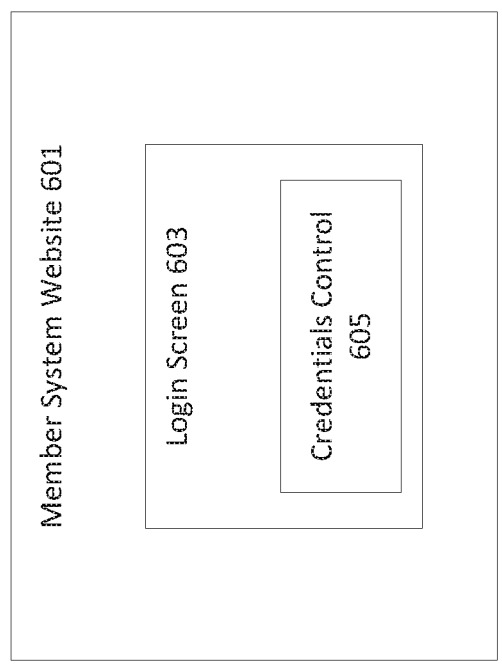

FIG. 6 depicts exemplary user interfaces for multi-factor authentication, consistent with disclosed embodiments. In some embodiments, these user interfaces may be present on user system 101, and on another device associated with the user (such as a computer, mobile phone, tablet, smartwatch, or similar device). Member system website 601 may comprise a website for member system 103. In some aspects, member system website 601 may comprise an authentication page for member system 103. For example, member system website 601 may comprise a login page, or a page for generating a new account with a commercial institution associated with member system 103. As described above with regard to FIG. 5, in response to an authentication request received from user system 101, member system 103 may be configured to provide a redirect message to user system 101. As shown in FIG. 6, user system 101 may be configured to create another window containing login screen 603 in response to the redirect request. In some aspects, login screen 603 may enable the user to provide authentication credentials for root system 107. For example, login screen 603 may be configured to allow the user to enter the authentication credentials into credentials control 605. Credentials control 605 may comprise a text box, menu, radio button, or other control known to one of skill in the art.

As described above with regard to FIG. 5, in response to authentication of credentials provided by user system 101, root system 107 may provide a consent message. This consent message may be provided to another device associated with the user. In some embodiments, this device may display application interface 611. In some aspects, application interface 611 may include a message, describing the purpose and use of the consent message. Application interface 611 may comprise confirmation control 615. In some aspects, application interface 611 may be configured to allow the user to select confirmation control 615 to complete multi-factor authentication with root system 107. In various aspects, confirmation control 615 may display a code. The user may be required to entire this code into another user interface (e.g., login screen 603) to complete multi-factor authentication with root system 107.

Figure 7:
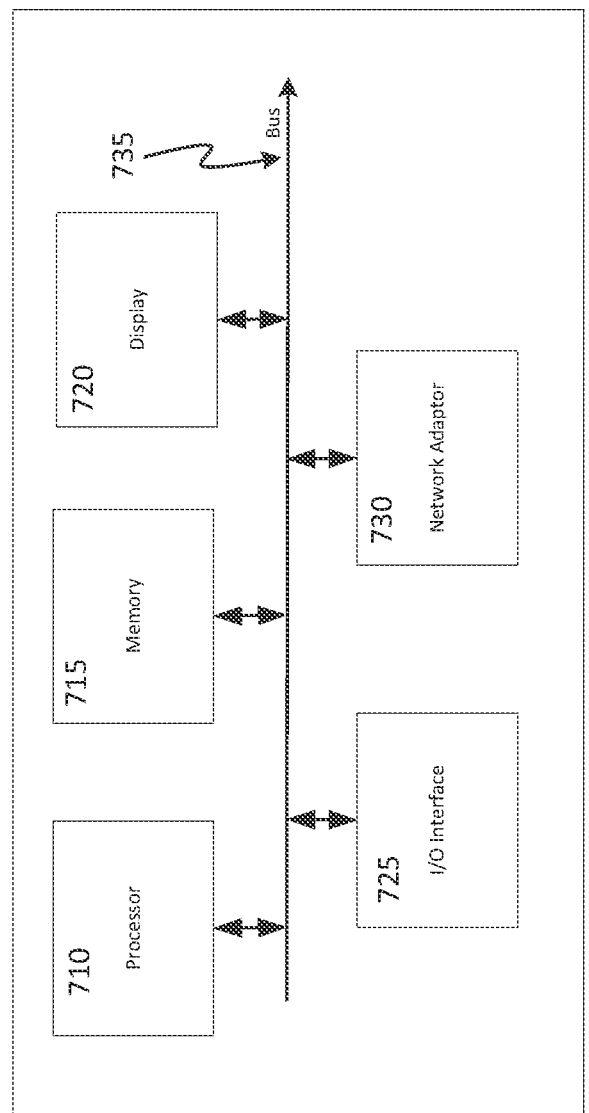
FIG. 7 depicts a schematic of an exemplary computing device for performing the envisioned systems and methods.
Figure 8:
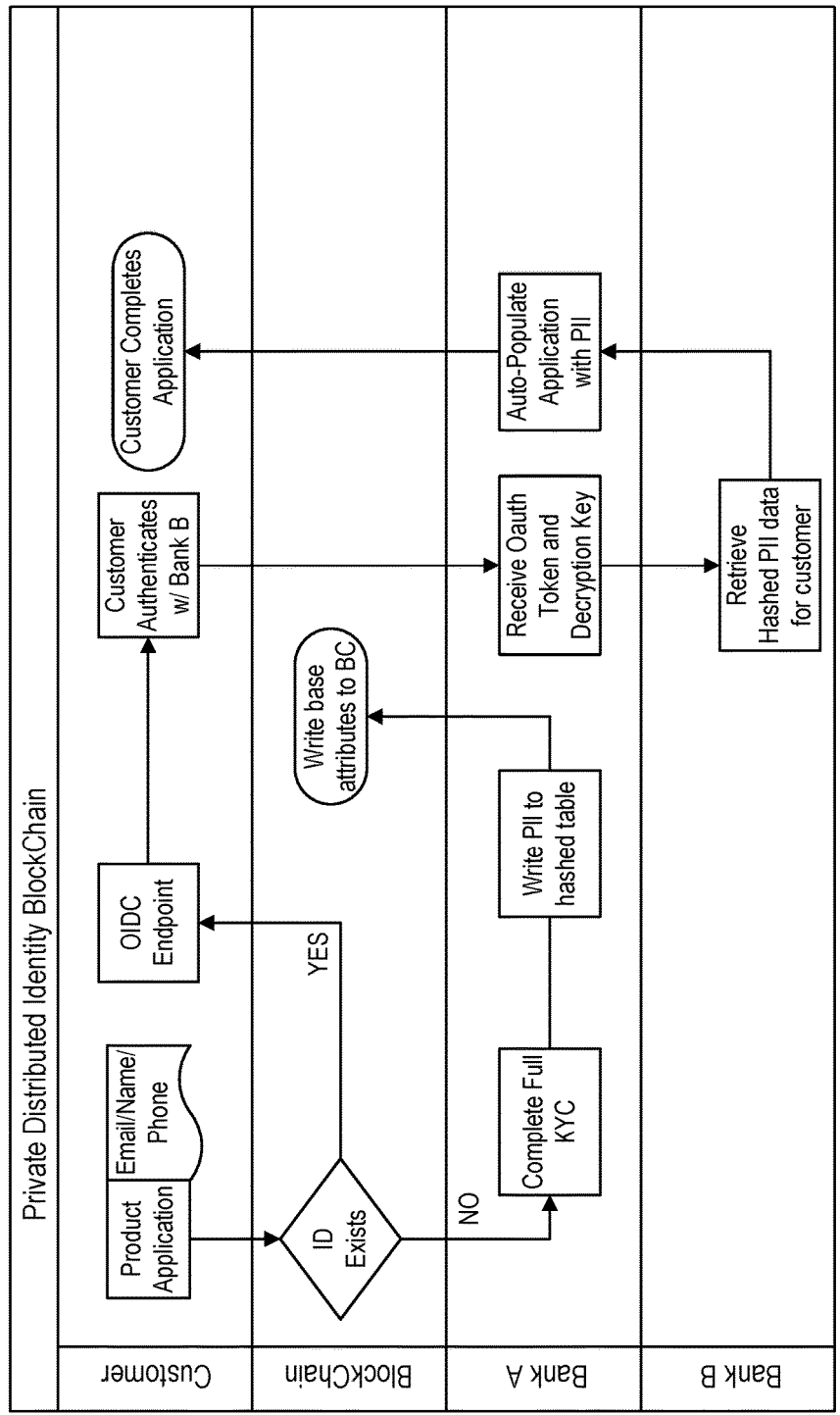
FIG. 8 depicts a flow diagram of an exemplary implementation.
Figure 9:
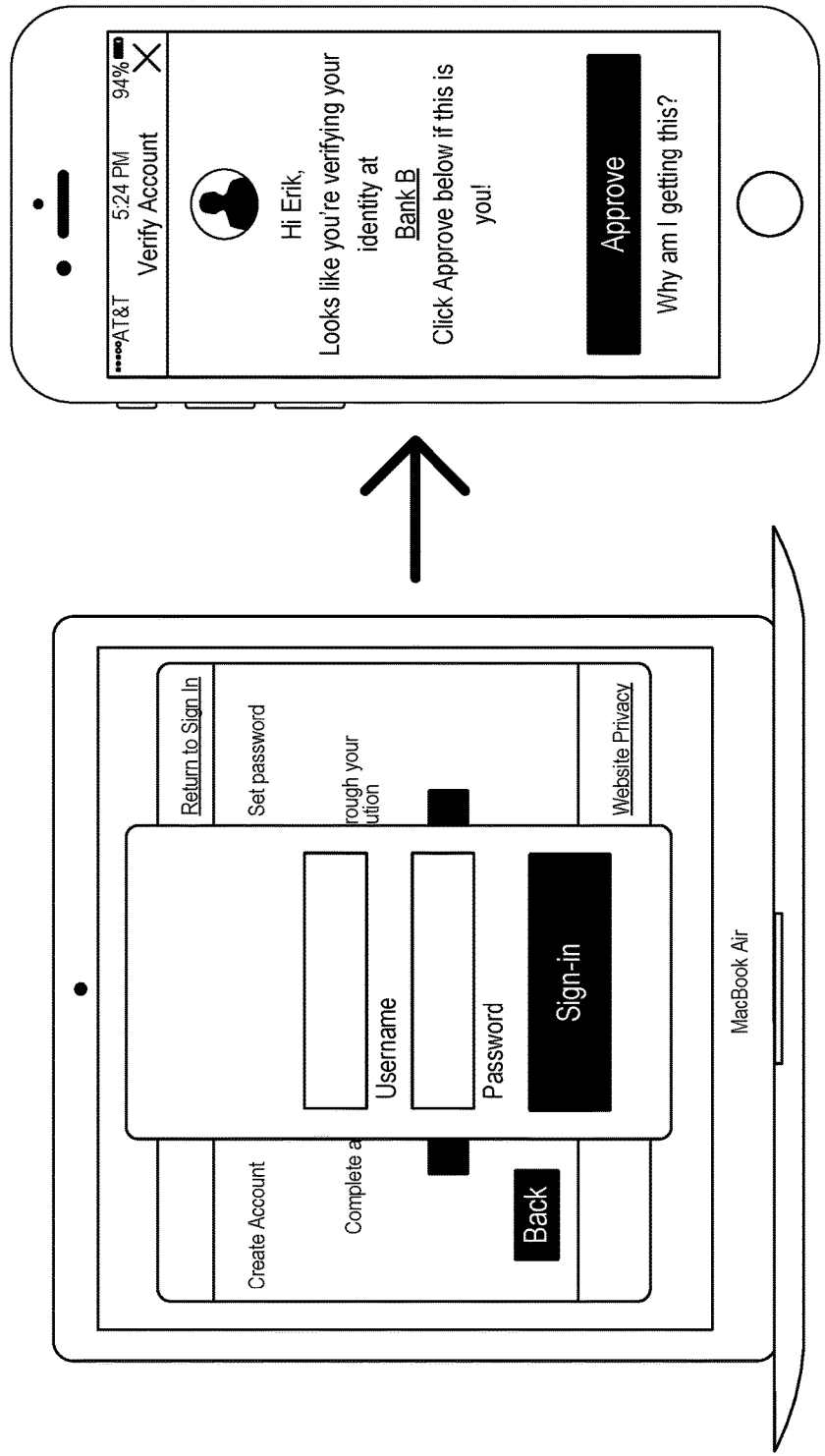
FIG. 9 depicts an exemplary customer verification flow.
Figure 10:
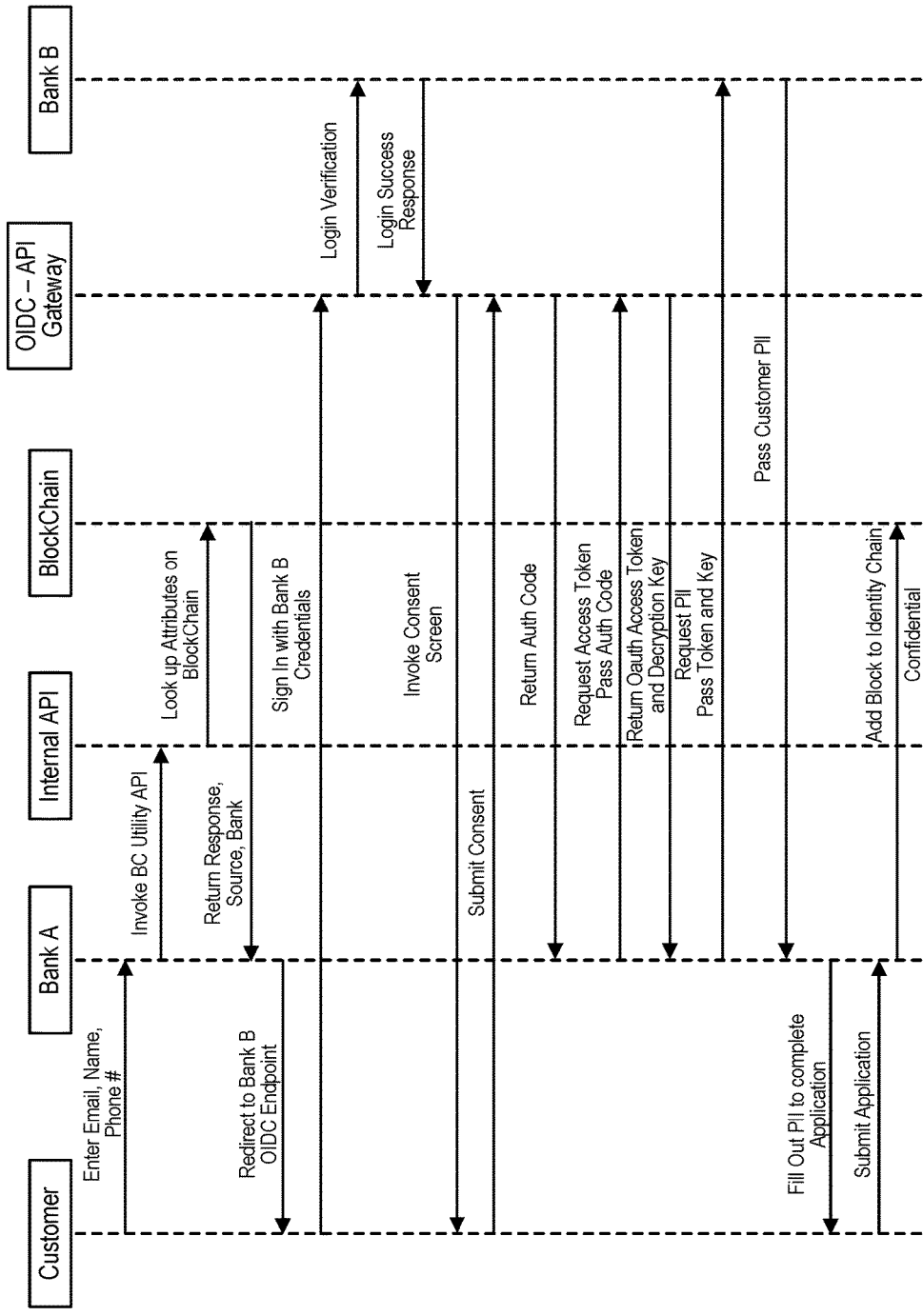
FIG. 10 depicts an exemplary sequence of data exchange.

FIG. 7 depicts a schematic of exemplary computing system 700 for performing the envisioned systems and methods, consistent with disclosed embodiments. In some embodiments, computing system 700 includes a processor 710, memory 715, display 720, I/O interface(s) 725, and network adapter 730. These units may communicate with each other via bus 735, or wirelessly. The components shown in FIG. 7 may reside in a single device or multiple devices.

Consistent with disclosed embodiments, processor 710 may comprise a central processing unit (CPU), graphical processing unit (GPU), or similar microprocessor having one or more processing cores. Computing system 700 may include one or more processors 710 and may further operate with one or more other processors that are remote with respect to processors 710. Memory 715 may include non-transitory memory containing non-transitory instructions, such as a computer hard disk, random access memory (RAM), removable storage, or remote computer storage. In some aspects, memory 715 may be configured to store data and instructions, such as software programs. For example, memory 715 may be configured to store data and instructions. In some aspects, processor 710 may be configured to execute non-transitory instructions and/or programs stored on memory 715 to configure computing system 700 to perform operations of the disclosed systems and methods. In various aspects, as would be recognized by one of skill in the art, processor 710 may be configured to execute non-transitory instructions and/or programs stored on a remote memory to perform operations of the disclosed systems and methods.

Display 720 may be any device which provides a visual output, for example, a computer monitor, an LCD screen, etc. I/O interfaces 725 may include hardware and/or a combination of hardware and software for communicating information to computing system 700 from a user of computing system 700, such as a keyboard, mouse, trackball, audio input device, touch screen, infrared input interface, or similar device. Network adapter 730 may include hardware and/or a combination of hardware and software for enabling computing system 700 to exchange information using external networks, such as network 111. For example, network adapter 730 may include a wireless wide area network (WWAN) adapter, a Bluetooth module, a near field communication module, or a local area network (LAN) adapter.

Other embodiments will be apparent to those skilled in the art from consideration of the specification and practice of the disclosed embodiments disclosed herein. It is intended that the specification and examples be considered as exemplary only, with a true scope and spirit of the disclosed embodiments being indicated by the following claims. Furthermore, although aspects of the disclosed embodiments are described as being associated with data stored in memory and other tangible computer-readable storage mediums, one skilled in the art will appreciate that these aspects can also be stored on and executed from many types of tangible computer-readable media, such as secondary storage devices, like hard disks, floppy disks, or CD-ROM, or other forms of RAM or ROM. Accordingly, the disclosed embodiments are not limited to the above described examples, but instead is defined by the appended claims in light of their full scope of equivalents.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

APPENDIX A

A. Exemplary Implementation

Creates a blockchain utility tool that leverages (OpenID Connect) OIDC capabilities to control access and maintain security of access to data on a private distributed blockchain. Creates a blockchain utility tool that allows miners to look up encrypted identity attributes (email, fname, (name, phone number) on the private distributed blockchain to verify if the identity has already been verified via acceptable KYC methods. The utility tool upon successful match of said attributes will redirect the customer to the correct OIDC endpoint for the FI that added the verified identity to the blockchain. The customer will authenticate with the credentials for that FI to retrieve and OAuth token and the tokenized decryption key. With that key, the mining bank can retrieve the tokenized personal identifying information (PII) associated with the blockchain attributes (SSN, DOB, address, etc.) in order to populate the application form.

B. Actors, Entities, Definitions

1. BlockChain Member: Financial Institutions (FIs) that are members of a private distributed identity blockchain adhere to the agreed upon smart contract guidelines
2. Customer: A prospective consumer that is applying for some product (Traditional FI, Identity only) with an FI on a private distributed identity blockchain.
3. BlockChain Miner: Associates of the FIs on the private distributed blockchain that continually mine the blockchain for updates to Identity data in order to validate that data
4. Root System: Provides identity and verification service with the power of multi-factor authentication.

C. Process Flow

1. A potential customer goes to entity A to apply online for a service.
2. Customer enters basic information on the application; email address, full name and phone number.
3. Entity A uses the blockchain utility too to call an API to lookup those attributes on the blockchain in real time. If the attributes are matched, proceed to step 7.
4. If the attributes are not a match, then Entity A presents BAU application flow for the customer to complete application and gather identity data to perform KYC.
5. Upon successful completion of KYC, Entity A updates the blockchain with encrypted email, full name and phone number so other FIs on the private blockchain can find it.
6. Entity A then adds all of the PII attributes to a distributed hashed table using agreed upon hash/salt protocols members of the BC agreed to.
7. Upon a successful match of the initial attributes, Entity A points the customer to the correct OIDC endpoint associated with Entity B, who is the FI that first added the verified identity to the blockchain.
8. The Customer is then prompted to authenticate with their credentials for Entity B. Upon a successful authentication, an OAuth token and a decryption key are provided back to Entity A.
9. Entity A then uses that key to call Entity B's distributed hash table via the external API gateway where the hashed PII identity attributes are stored.
10. Entity A retrieves the PII and populates their application form for the customer and completes the process w/o the need to conduct further KYC actions.

What is claimed is:

1. An authentication system for authenticating a user in a consortium including at least two systems, wherein one of the at least two systems initially authenticates the user and is a root system for the user, the root system being distinct from the user, and the other systems of the at least two systems are member systems for the user, the authentication system comprising:
   at least one processor; and
   at least one non-transitory memory containing instructions that, when executed by the at least one processor, cause the authentication system to:
   receive, from the member system, an authentication request for the user;
   determine the root system for the user using a blockchain, wherein determining the root system comprises identifying, using the authentication request and index information stored in the blockchain, a block of the blockchain storing root system information for the user;
   redirect the member system to the determined root system;
   receive, from the determined root system, a root system secret; and
   receive, from a database, identification data using the root system secret, wherein the root system secret comprises a root system key, and wherein receiving the identification data comprises retrieving encrypted identification data from the database, and decrypting the encrypted identification data using the root system key.

2. The authentication system of claim 1, wherein the memory contains further instructions that, when executed by the at least one processor, cause the authentication system to:
   receive, following redirection, a verification message indicating that the root system successfully authenticated the user.

3. The authentication system of claim 2, wherein the verification message indicates multi-factor authentication of the user by the root system.

4. The authentication system of claim 2, wherein the verification message comprises an authorization code for receiving, from the root system, the root system secret.

5. The authentication system of claim 1, wherein the memory contains further instructions that, when executed by the at least one processor, cause the authentication system to:
   write authentication information to the blockchain, the authentication information comprising index information and an authentication record.

6. The authentication system of claim 5, wherein the authentication record comprises an indication of the at least one of the user, the authentication system, the root system, a purpose of the authentication request, and a result of the authentication request.

7. The authentication system of claim 5, wherein writing the authentication information to the blockchain comprises providing the authentication information to an authorized system that adds a block storing the authentication information to the blockchain.

8. The authentication system of claim 5, wherein writing the authentication information to the blockchain comprises adding a block storing the authentication information to the blockchain, the block satisfying at least one of a proof-of-work condition and a digital signature condition.

9. The authentication system of claim 1, wherein the root system secret comprises an authorization token for receiving, from the database, the identification data.

10. The authentication system of claim 9, wherein the root system comprises an OIDC endpoint, and wherein the authorization token comprises an OAuth Authorization Security Token.

11. An authentication system for authenticating a user in a consortium including at least two systems, wherein one of the at least two systems initially authenticates the user and is a root system for the user, the root system being distinct from the user, and the other systems of the at least two systems are member systems for the user, the authentication system comprising:

at least one processor; and at least one non-transitory memory containing instructions that, when executed by the at least one processor, cause the authentication system to:

receive personal information for the user;

generate identification data and index information for the user using the received personal information;

write root system information and the index information to a blockchain, wherein:

the root system information indicates a location associated with the root system for the user; and writing the root system information and the index information to the blockchain comprises providing the root system information and the index information to an authorized system that adds a block storing the root system information and the index information to the blockchain, the block satisfying at least one of a proof-of-work condition and a digital signature condition;

encrypt the identification data using a root system key; and store the encrypted identification data in a database.

12. The authentication system of claim 11, wherein the memory contains further instructions that, when executed by the at least one processor, cause the authentication system to:

determine initially that the blockchain lacks a block storing root system information of the user.

13. The authentication system of claim 11, wherein the memory contains further instructions that, when executed by the at least one processor, cause the authentication system to:

receive, from the member system, an authentication request for the user; and provide, to the member system, a verification message indicating multi-factor authentication of the user.

14. The authentication system of claim 13, wherein providing the verification message comprises providing an authorization code to the member system.

15. The authentication system of claim 13, wherein the memory contains further instructions that, when executed by the at least one processor, cause the authentication system to:

provide, to the member system, an authorization token and the root system key for decrypting the encrypted identification data.

16. The authentication system of claim 15, wherein the authentication system comprises an OIDC endpoint, and wherein the authorization token is an Oauth Authorization Security Token.

17. The authentication system of claim 15, wherein decryption of the encrypted identification data requires a root system salt, and the operations further comprise providing, to the member system, the root system salt for decrypting the encrypted identification data.

18. The authentication system of claim 11, wherein the index information comprises obfuscated or encrypted non-sensitive personal information of the user.

19. The authentication system of claim 18, wherein generating the index information comprises encrypting the index information with a symmetric key or a private key.

20. The authentication system of claim 18, wherein the non-sensitive personal information of the user comprises at least one of a full name, e-mail, and phone number of the user.

21. The authentication system of claim 11, wherein the identification data comprises sensitive personal information of the user.

22. The authentication system of claim 21, wherein the sensitive personal information of the user comprises at least one of social security number, address, taxpayer identification number, and identify verification method.

* * * * *